F. W. WIESEBROCK.

Fountains for Soda-Water, &c.

No. 5,857 Reissued April 28, 1874.

Witnesses.

Ernst Bilhuber

Henry Gentner

Inventor.

Frederick W. Wiesebrock per

Van Santvoord & Hauff

Attys

UNITED STATES PATENT OFFICE.

FREDERICK W. WIESEBROCK, OF NEW YORK, N. Y., ASSIGNOR OF ONE-HALF INTEREST TO HENRY DOWNES.

IMPROVEMENT IN FOUNTAINS FOR SODA-WATER, &c.

Specification forming part of Letters Patent No. 145,139, dated December 2, 1873; reissue No. 5,857, dated April 28, 1874; application filed April 10, 1874.

*To all whom it may concern:*

Be it known that I, FREDERICK W. WIESEBROCK, of the city, county, and State of New York, have invented a new and useful Improvement in Fountains for Effervescent Liquids; and I do hereby declare the following to be a full, clear, and exact description thereof, which will enable those skilled in the art to make and use the same, reference being had to the accompanying drawing forming part of this specification, in which drawing—

Figure 1:
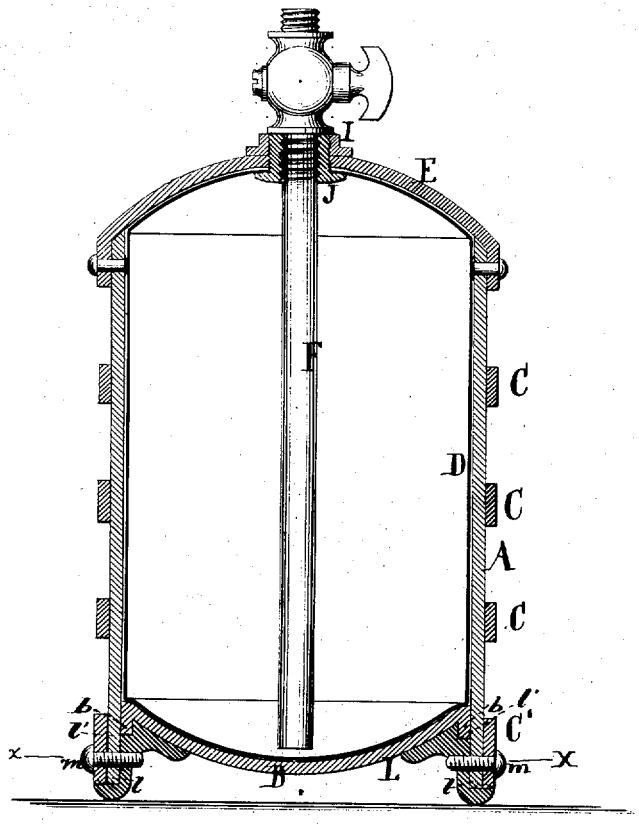
Figure 2:
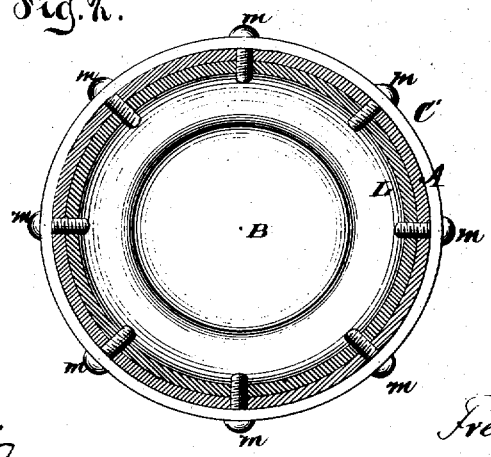

Figure 1 represents a vertical central section of this invention. Fig. 2 is a horizontal section of the same in the plane *x x*, Fig. 1, and looking in the direction of the arrow opposite to that line.

Similar letters indicate corresponding parts.

This invention consists in the arrangement of two nuts combined with a pipe which extends through the cover, and with a lining of tin or other non-corrosive material situated in the interior of a fountain, and with the cover of said fountain in such a manner that by said nuts the lining is firmly retained in position, and by removing one of said nuts the lining can be readily detached from the cover; also, in a bottom which is provided with a recess to receive the bottom edge of the body of a fountain, in combination with screws passing through said bottom edge and through the bottom in such a manner that by inserting the screws the bottom and the body are firmly connected, and by removing the screws the bottom can be taken off and access is had to the interior of the fountain.

In the drawing, the letter A designates the body of my fountain, which is made of sheet metal and provided with a lining, D, of tin or other non-corrosive material. Said body is strengthened by hoops C, and it is provided with a bottom, B L, of cast-iron or other suitable material, which is provided with a recess, *l*, to receive the bottom edge of the body A. Screws *m* serve to connect the bottom edge of the body to the bottom, said bottom serving to support the bottom of the lining D against the pressure of the effervescent liquid contained in the fountain. By removing the screws *m* the bottom B L can be readily taken off and the lining can be conveniently introduced or removed. In order to impart additional strength to the bottom edge of the body A, a hoop, C′, is applied, as shown in Fig. 1. The bottom B L is, by preference, made in two parts, the outer or lower part being made of cast-iron, while the inner part or bottom B is made of sheet metal, which is connected to the outer part by a downwardly-projecting flange, *b*, that fits a recess, *l′*, and is secured in position by solder or other suitable means. The lining D is made to fit the body A loosely, and it is held to the cover E of said body and to the discharge-pipe F by the flanged nuts I J. The flange of the nut J catches inside of the lining D, and said nut is provided with an internal screw-thread to fit a thread on the discharge-pipe, and also with an external screw-thread to receive the nut I, the flange of which, when the same is screwed down, bears upon the surface of the cover E. By interposing suitable packing-rings tight joints are produced between the lining and the cover.

When the bottom B L, the pipe F, and the nut I are removed the lining D and nut J can be taken out. The nut J is riveted or otherwise fastened to the lining, so as to be removable with it.

By this arrangement the expense of the construction of the body A is materially reduced, and all needed repairs to the lining can be easily and cheaply made.

What I claim as new, and desire to secure by Letters Patent, is—

1. The nuts I *J*, combined with the lining D, pipe T, and cover E, substantially as and for the purpose described.

2. The removable bottom B L, provided with a recess, *l*, in combination with the body A and screws *m*, substantially as and for the purpose set forth.

FREDERICK W. WIESEBROCK.

Witnesses:

W. HAUFF,

E. F. KASTENHUBER.